(12) United States Patent
Farrell et al.

(10) Patent No.: US 8,176,301 B2
(45) Date of Patent: May 8, 2012

(54) MILLICODE ASSIST INSTRUCTIONS FOR MILLICODE STORE ACCESS EXCEPTION CHECKING

(75) Inventors: Mark S. Farrell, Pleasant Valley, NY (US); Bruce C. Giamei, Poughkeepsie, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/031,756

(22) Filed: Feb. 15, 2008

(65) Prior Publication Data

US 2009/0210680 A1 Aug. 20, 2009

(51) Int. Cl.
- G06F 9/30 (2006.01)
- G06F 9/40 (2006.01)
- G06F 7/38 (2006.01)
- G06F 9/00 (2006.01)
- G06F 9/44 (2006.01)

(52) U.S. Cl. ......... 712/245; 712/219; 712/227; 712/244

(58) Field of Classification Search .................. 712/245, 712/219

See application file for complete search history.

(56) References Cited

U.S. PATENT DOCUMENTS

| | | | |
|---|---|---|---|
| 5,226,164 A | | 7/1993 | Nadas et al. |
| 5,611,062 A | | 3/1997 | Webb et al. |
| 5,680,598 A | * | 10/1997 | Farrell et al. .................. 712/227 |
| 5,694,587 A | * | 12/1997 | Webb et al. .................... 712/224 |
| 5,748,951 A | * | 5/1998 | Webb et al. .................... 712/245 |
| 5,790,844 A | * | 8/1998 | Webb et al. .................... 712/227 |
| 6,067,617 A | | 5/2000 | Webb et al. |
| 6,125,444 A | | 9/2000 | Check et al. |
| 6,662,296 B1 | | 12/2003 | Farrell et al. |
| 6,671,793 B1 | | 12/2003 | Swaney et al. |

OTHER PUBLICATIONS z/Architecture, Principles of Operation, Sixth Edition, Apr. 2007, Publication No. SA22-7832-05, copyright IBM Corp. 1990-2007, pp. 1-1218.

\* cited by examiner

*Primary Examiner* — Aimee Li
*Assistant Examiner* — William Partridge
(74) *Attorney, Agent, or Firm* — Cantor Colburn LLP; John Campbell

(57) ABSTRACT

Millicode store access checking instructions are provided via an operand access control register (OACR) including a test modifier indicator, which is communicatively coupled to an instruction unit subsystem, the instruction unit subsystem for fetching and decoding instructions. The instructions include a millicode instruction with an operand defining an address to check for a store access exception. In addition, an execution unit for executing the millicode instruction performs a method. The method includes receiving the millicode instruction from the instruction unit subsystem, testing for the store access exception at the address as if the test modifier is set absent an update to the OACR, and outputting a result of the testing for the store access exception.

20 Claims, 3 Drawing Sheets

MILLICODE ASSIST INSTRUCTIONS FOR MILLICODE STORE ACCESS EXCEPTION CHECKING

BACKGROUND OF THE INVENTION

This invention relates generally to improvements in computer processors that execute relatively simple instructions in hardware controlled execution units and execute relatively complex instructions in a milli-mode architected state with vertical microcode (i.e., millicode) routines executing in the same hardware controlled execution units, and more particularly to millicode store access checking instructions with reduced delays.

Instruction sets used in computer systems employing so-called Complex Instruction Set Computing (CISC) architecture include both simple instructions (e.g., Load, or Add) and complex instructions (e.g., Program Call, or Load Address Space Parameters). As the computer systems have become more powerful, larger percentages of the instruction set have been implemented using hardware execution units to increase the systems performance. Conventionally, complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

A milli-mode operation enables implementation of complex functions in a large, hardware controlled, pipelined, general-purpose digital computer without an additional dedicated microprocessor-based execution unit. Milli-mode implements these complex functions with flexibility provided by firmware and avoids a packaging problem introduced by the inclusion of the additional microprocessor hardware. Rather than an additional microprocessor, milli-mode uses preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in instruction decode logic detects a need to enter milli-mode, and this causes millicode routines to be fetched. The millicode routines are decoded by the decoder hardware and dispatched for execution in the same way as the architected macro-instructions (system-mode instructions).

A majority of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of the architected instructions. In this way, the unique hardware required to implement these instructions is minimized, and the simplicity of the hardware design is maintained. This simplicity of hardware controls is a chief advantage of millicode over other forms of internal code (e.g., microcode), which require considerably more unique hardware.

A disadvantage of a millicoded design is that some complex operations require more internal code instructions and/or more machine cycles than with some forms of microcode. In some cases, this is due to the inefficiency of the base instruction set when used to perform these complex operations. Depending on the frequency with which these operations are performed, the impact on overall system performance may be significant.

Millicode that accesses storage, just like architected instructions, are executed by generic hardware constructs. Therefore, millicode is subject to various kinds of hardwired architectural access exception checks and default cache operation behavior. It is desirable for millicode to be capable of accessing a storage location, as well as to avoid or alter certain default operand cache behavior. Any storage access may require proper authority. Prior approaches provide an operand access control register (OACR) mechanism to override many aspects of default operand cache access characteristics. One such approach includes suppressing interrupts when an access exception is detected. However, this is subject to pipeline delays when the OACR needs to be written (after execution) before the affected instruction can issue its operand fetch (occurring much earlier in the processor pipeline). This results in a "bubble" in the pipeline that translates to a reduction in instructions per cycle as delays are incurred to rectify interlock condition between the instruction and the OACR. One example is described in U.S. Pat. No. 5,790,844, which provides a "load and access test" that can check for "load" type exceptions without taking an actual interrupt, but requires a test "tag" from the OACR to be updated to check for a "store" type access exception.

It would be beneficial to develop milli-mode assist instructions enabling millicode access to a storage operand and directly checking for store-type access exceptions without incurring OACR update interlock delays. Accordingly, there is a need in the art for millicode store access checking instructions.

BRIEF SUMMARY OF THE INVENTION

An exemplary embodiment includes a system for a millicode store access checking instruction. The system includes an operand access control register (OACR) including a test modifier indicator. The system also includes an instruction unit subsystem for fetching and decoding instructions. The instructions include a millicode instruction with an operand defining an address to check for a store access exception. The system further includes an execution unit to execute the millicode instruction. The execution unit performs a method. The method includes receiving the millicode instruction from the instruction unit subsystem, testing for the store access exception at the address as if the test modifier is set absent an update to the OACR, and outputting a result of the testing for the store access exception.

Another exemplary embodiment includes a method for a millicode store access checking instruction in a processor. The method includes fetching a millicode instruction with an operand defining an address to check for a store access exception. The method also includes testing for the store access exception at the address as if a test modifier in an OACR is set absent an update to the OACR. The method further includes outputting a result of the testing for the store access exception.

A further exemplary embodiment includes computer program product for executing a millicode store access checking instruction. The computer program product includes a computer-readable storage medium storing instructions for executing the millicode store access checking instruction. The millicode store access checking instruction includes a method of accessing an operand defining an address to check for a store access exception, and testing for the store access exception at the address as if a test modifier in an OACR is set absent an update to the OACR. The method further includes outputting a result of the testing for the store access exception.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides millicode store access checking instructions. Access checking is performed to detect error conditions associated with attempts to access storage, such as a lack of valid access authority to a protected location, an invalid address, and the like, that can result in an exception. The millicode store access checking instructions enable access to a storage operand and directly check for store-type access exceptions without incurring operand access control register (OACR) update interlock delays in a pipelined processing system. The OACR can provide information regarding how to interpret an address presented by a millicode routine. For example, the OACR may include a storage access key, an address-space control, an addressing mode, and an addressing type (e.g., real, virtual, host real, absolute, or hardware system area), in addition to special controls which can block program event recording (PER) storage alteration detection or protection exceptions, and can pretest for store-type access exceptions. However, accessing the OACR during pipelined operation can incur a delay penalty, as an update to the OACR may be needed prior to completing execution of an instruction that can result in an exception. Rather than using the OACR to block exceptions or simply blocking interrupts, millicode assist instructions are designed to check for an exception and set a condition code in response to the check. In an exemplary embodiment, the millicode assist instructions that are provided include: test access character with test modifier (TACTM) and store character with test modifier (STCTM). The TACTM checks for both fetch-type and store-type exceptions while accessing storage. If an access exception is detected, a condition code is updated but no interrupt is taken. The STCTM checks for store-type exceptions, but does not attempt to update storage. If an access exception is detected, an interrupt is taken; otherwise, it acts like a no operation (no-op) instruction. Further details regarding the TACTM and STCTM are provided herein.

Figure 1:
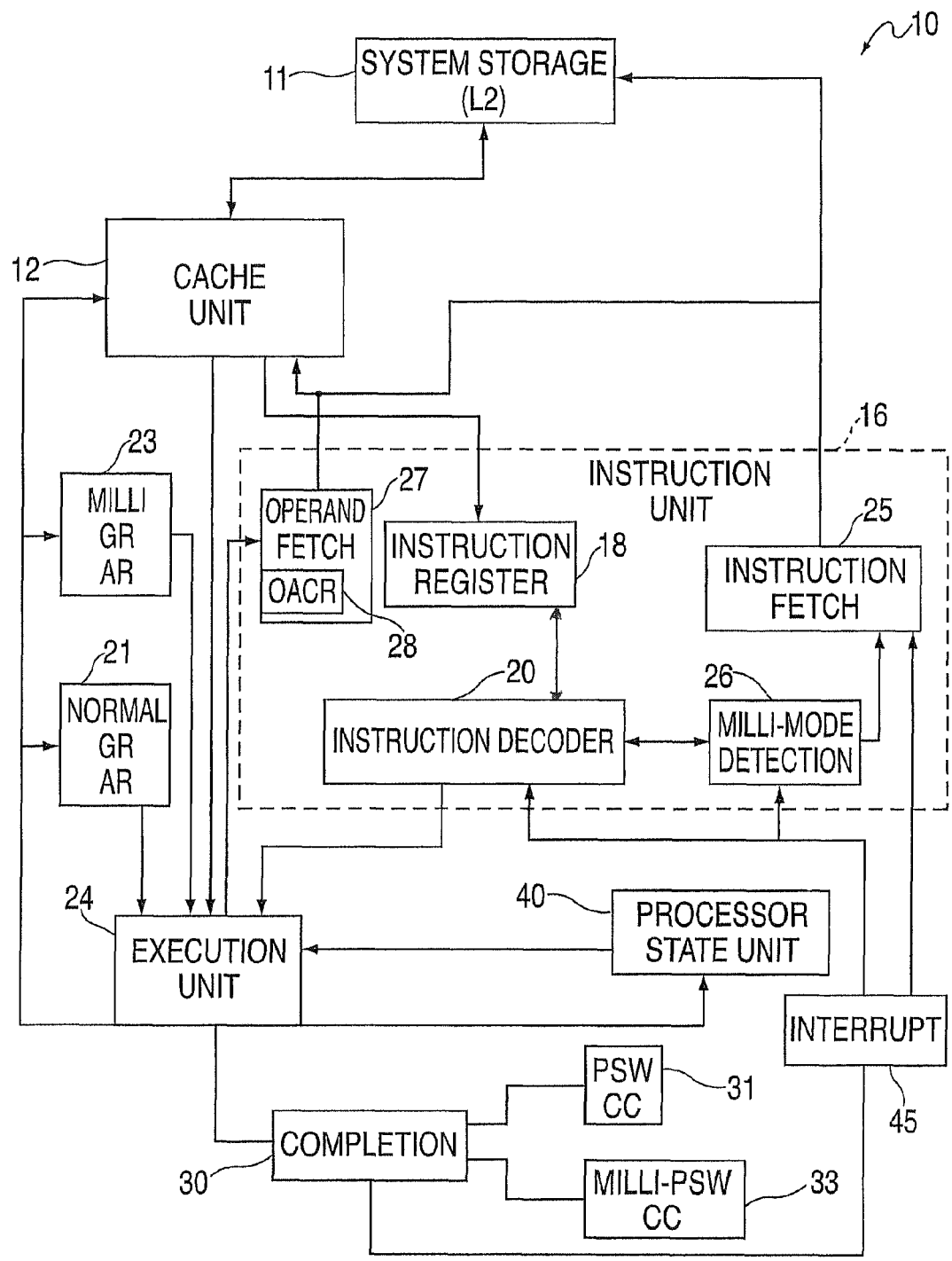
FIG. 1 depicts a block diagram of a system for millicode store access checking instructions in accordance with an exemplary embodiment.

Referring now to FIG. 1, elements of a system 10 relevant to this invention include a system storage 11, and a cache memory unit 12. The system 10 may be a processor capable of executing instructions using a pipeline. The system storage 11 contains the instructions that the processor is executing as well as data that the instructions are manipulating. The cache memory unit 12 may include a copy of the data and instructions the processor is presently executing, including milli-mode routines.

An instruction unit subsystem 16 includes an instruction buffer (not shown in FIG. 1), instruction registers 18 and an instruction decoder 20. The instruction unit subsystem 16 receives macro-instructions, millicode instructions, and data from the cache memory unit 12. Instructions are parsed and placed into the instruction registers 18. The instruction decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers (normal-GRs/ARs) 21 for normal macro-code instruction execution and to a set of general purpose registers and access registers (milli-GRs/ARs) 23 for millicode instruction execution. Control logic controls the exchange of data between the two sets of registers when beginning or terminating a millicode routine. The instruction unit subsystem 16 also includes an operand fetch unit 27 with one or more OACRs 28. The operand fetch unit 27 can fetch operands for instructions from the cache memory unit 12 and may also fetch operands from the system storage 11. The OACR 28 can provide operand access information during a millicode routine as well as block PER storage alteration detection or protection exceptions, and can pretest for store-type access exceptions. The OACR 28 may be updated by the execution unit 24.

Milli-mode detection logic 26 is coupled to the instruction registers 18 and detects when a macro-instruction, which is being decoded, is of a type that is to be interpreted in a milli-mode operation. When this occurs, the milli-mode detection logic 26 generates an entry point address and passes this address along to instruction fetch control logic 25 and places the instruction decoder 20 into a milli-mode operating state. In this state the instruction decoder 20 is enabled to decode milli-mode instructions, and operand fetch 27 will start processing operand access according to OACRs 28 when instructed. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the instruction decoder 20 allow the instruction decoder 20 to keep track of instruction completion. A program status word (PSW) in PSW register 31 controls execution of the macro-program. Similarly, the system 10 also includes a milli-PSW register 33, which controls execution of the milli-routine. Both the execution unit 24 and the completion logic 30 are connected to read from/write to the PSW and the milli-PSW registers 31 and 33. Thus, at any given point the execution units 24 or the completion logic 30 can read or update the appropriate one of the PSW register 31 and/or milli-PSW register 33. The PSW register 31 includes a condition code (CC) that the execution unit 24 can update while executing an instruction. The milli-PSW register 33 also includes a CC. The completion logic 30 updates the CC in either the PSW register 31 or milli-PSW register 33 upon completing an instruction. The CC in the PSW register 31 is modified based on a macro-code instruction, while the CC in the milli-PSW register 33 is modified based on a millicode instruction although milli-mode instructions can sometimes directly update the PSW register 31 including its CC.

A processor state unit 40 maintains the entire updated status of the system 10 both in regular mode and milli-mode operation. In the event of a detected error, the processor state unit 40 provides a resource to recreate the status of the system 10 from a check point state in order to allow a retry of the error causing operation.

Milli-mode is enabled when the milli-mode detection logic 26 recognizes that the macro-instruction being decoded is to be implemented with millicode. In response to this recognition, the milli-mode detection logic 26 signals the instruction decoder 20, the instruction fetch control logic 25 and register controls in the execution unit 24. In response to the milli-mode recognition signal from the milli-mode detection logic 26, the instruction decoder 20 suspends macro-mode decoding, the execution unit register control optionally copies the contents of some of the normal-GRs/ARs 21 to the milli-GRs/ARs 23 and causes the system 10 to subsequently use the milli-GRs/ARs 23. The milli-mode detection logic 26 generates a millicode entry point address.

The entry point address (generated by the milli-mode detection logic 26) is used by the instruction fetch control logic 25 to address the cache memory unit 12. Milli-instructions are sent to the instruction registers 18 where the instruction decoder 20 decodes them and schedules them for execution.

When the system 10 enters milli-mode, it executes and completes the macro-instructions already pipelined conceptually prior to the instruction that caused entry into milli-mode. As the system 10 completes the macro-instructions, it updates the appropriate milli-GRs/ARs 23. At the same time, the system 10 decodes and executes the milli-instructions that implement the macro-instruction that caused entry into milli-mode.

At some point the macro-instruction immediately prior to the instruction that caused entry to milli-mode will be indicated completed in the completion logic 30. Only then does the system 10 begin to complete the milli-instructions. The system 10 then continues decoding, executing and completing the milli-instructions.

Eventually, the milli-mode detection logic 26 recognizes a millicode END (MEND) milli-instruction. When the milli-mode detection logic 26 detects a MEND milli-instruction, it causes the system 10 to cease fetching milli-instructions. Further, when MEND is detected, the milli-mode detection logic 26 puts the instruction decoder 20 in macro-mode and causes the system 10 to begin fetching macro-instructions. Millicode explicitly updates all registers, so there is no transfer of register content when going from milli-mode operation to regular operation. Completion of a MEND milli-instruction causes the completion logic 30 to begin completing macro-instructions.

The system 10 can also enter milli-mode in response to an interrupt. When the completion logic 30 detects an interrupt, the interrupt priority logic 45 determines that an interrupt is to be serviced and it signals the instruction fetch control logic 25, causing the instruction decoder 20 to initiate milli-mode.

The recognition of an interruption condition causes the system 10 to halt macro-mode execution at the next interruptible point. The interrupt priority logic 45 also generates control inputs which are used by the milli-mode detection logic 26 to generate an entry point address with which to address the memory cache unit 12. These milli-instructions are sent to the instruction registers 18 where the instruction decoder 20 decodes them and schedules them for execution at the appropriate hardware execution elements.

The system 10 proceeds to decode, execute and complete the milli-instruction in the milli-routine for interrupts. Eventually, the instruction decoder 20 recognizes a MEND milli-instruction. This causes the instruction decoder 20 to stop decoding in milli-mode. Depending on whether or not there are additional interrupts that require servicing, the decoder hardware will either redo the interrupt process or return to decoding macro-instructions from the cache memory unit 12.

Millicode statements, just like hardware executed macro-code instructions, are subject to access exception tests. That is, if millicode accesses a storage operand and an exception occurs, the interrupt logic 45 can interrupt the millicode routine and pass control to a program exception interrupt handler.

Figure 2:
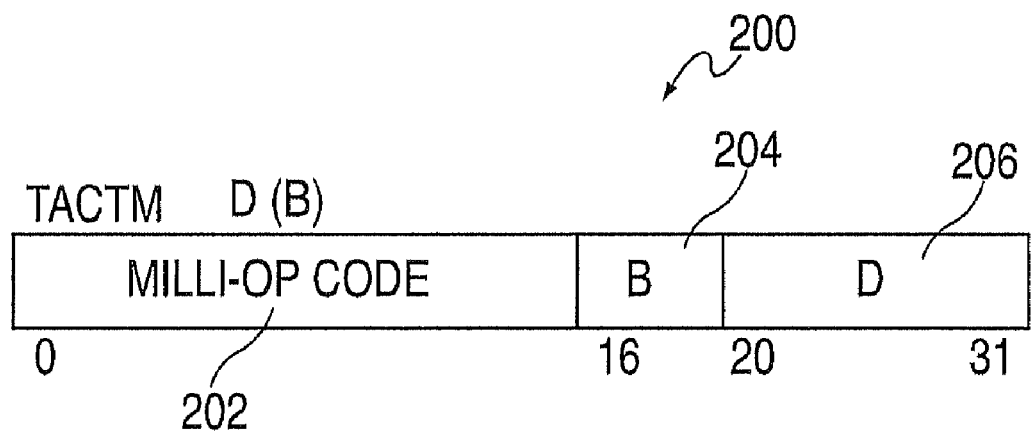
FIG. 2 depicts an instruction format for a test access character with test modifier instruction in accordance with an exemplary embodiment.
Figure 3:
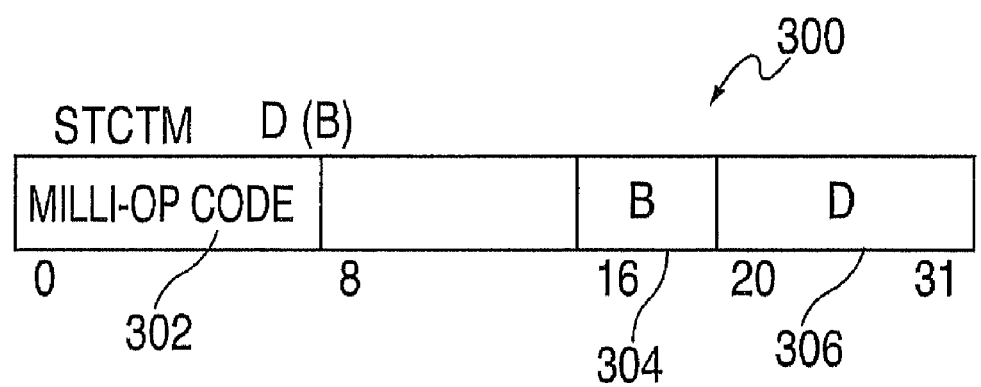
FIG. 3 depicts an instruction format for a store character with test modifier instruction.

In many cases, millicode must explicitly detect access exceptions for storage operands while at the same time retaining control in the current millicode routine to ensure that exceptions are handled correctly and with the right priority. The system 10 has a Test Access Character With Test Modifier (TACTM) millicode instruction as illustrated in FIG. 2 to meet this requirement with the addition of minimal unique hardware. Similarly, millicode must explicitly detect access exceptions for storage operands, such that it expects to be interrupted if an exception is detected, but does not intend to do any actual storage update even if the access is allowed. The system 10 has a Store Character with Test Modifier (STCTM) millicode instruction as illustrated in FIG. 3 to meet this requirement with the addition of minimal unique hardware.

FIG. 2 depicts one embodiment of an instruction format for a TACTM 200 millicode instruction. The TACTM 200 includes a milli-opcode 202 to identify the instruction, as well as two potential operands, B 204 and D 206. The operands B 204 and D 206 supply address information for the TACTM 200. In an exemplary embodiment, the operand B 204 is a storage base address value. B 204 may be defined in the milli-GRs/ARs 23. The operand D 206 is a storage displacement value that can be offset relative to the value of B 204. The TACTM 200 tests for access exceptions in a byte of the system storage 11 of FIG.1 as addressed by the combination of B 204 and D 206. In executing the TACTM 200, access exceptions associated with the storage access are blocked, and do not result in a program interruption via the interrupt logic 45. Instead, a value is set in the CC of the milli-PSW register 33. No registers are loaded with the storage data. A test modifier in the OACR 28 indicates that a special test state is active. PER can assist in debugging programs by permitting the program to be alerted to various types of events, such as execution of a successful branch instruction, fetching of an instruction from a designated storage area, alteration of the contents of the designated storage area, and the like. Blocking the PER storage alteration indicator may be desired while executing millicode instructions that would otherwise trigger an exception. The TACTM 200 checks for store access exceptions (right to modify) as well as for fetch access exceptions (right to use) as if the test modifier in the OACR 28 was set and executes as if the block PER storage alteration indicator in the OACR 28 is also set. Therefore, pipelined instruction flow can proceed without the delay that would otherwise occur in waiting for an explicit update to the OACR 28. The actual values of the test modifier and the block PER storage alteration indicator in the OACR 28 are unchanged by the TACTM 200 instruction. The TACTM 200 provides a means to check for access exceptions without having to set the associated OACR 28 test modifier. This provides an improvement over prior art systems, which may have to update the OACR 28, resulting in an address generation interlock (AGI) delay before testing for the access exception. The AGI delay, which is a byproduct of instruction access dependencies between an instruction and accessing the OACR 28, can be avoided.

The TACTM 200 checks for both fetch-type and store-type exceptions while accessing the system storage 11. If an access exception is detected, the CC is updated in the milli-PSW register 33, but no interrupt is taken. The CC in the milli-PSW register 33 is set to indicate whether any access exception conditions were present for the operand storage access as depicted in table 1.

TABLE 1

Millicode Condition Code Values for TACTM

| Code | Condition |
|---|---|
| 0 | No access exceptions found |
| 1 | Access exception found and blocked |
| 2 | Reserved |
| 3 | Host translation found and blocked |

The access exceptions do not cause an interrupt, but instead set the CC in the milli-PSW register 33 as shown in Table 1. In particular, the TACTM 200 sets the CC to 0 if no access exception is detected, and sets it to either 1 or 3 if the instruction detects an access exception. The instruction sets the CC to 3 when the current program is executing in emulation and the access exception is associated with address translation using the host setup. The instruction sets the CC to 1 for all other access exceptions. Hardware suppresses reporting of these access exceptions to any other architected states and uses the access exception information only to set the CC. The additional hardware introduces no timing or performance constraints since access exception information is available with the same timing as the data being retrieved.

FIG. 3 depicts one embodiment of an instruction format for a STCTM 300 millicode instruction. The STCTM 300 includes a milli-opcode 302 to identify the instruction, as well as two potential operands, B 304 and D 306. Even though the STCTM 300 appears similar in form to a store character instruction, no storage update is actually performed. The operands B 304 and D 306 supply address information for the STCTM 300 to check for a store-type exception in the system storage 11 of FIG. 1. In an exemplary embodiment, the operand B 304 is a storage base address value. B 304 may be defined in the milli-GRs/ARs 23. The operand D 306 is a storage displacement value that can be offset relative to the value of B 304. The STCTM 300 does not alter the value at the address defined by the operands B 304 and D 306. Similar to the TACTM 200 of FIG. 2, the STCTM 300 executes as if the test modifier and the block PER storage alteration indicator in the OACR 28 of FIG. 1 are set. The actual values of the test modifier and the block PER storage alteration indicator in the OACR 28 are unchanged by the STCTM 300. The STCTM 300 provides a means to check for access exceptions without having to set the associated OACR 28 test modifier. This provides an improvement over prior art systems, which may have to update the OACR 28, resulting in an AGI delay before testing for the access exception. The STCTM 300 checks for only store-type exceptions, but does not attempt to update the system storage 11 of FIG. 1. If an access exception is detected, an interrupt is taken via the interrupt logic 45; otherwise, the STCTM 300 acts like a no-op instruction. It will be understood that although the mill-opcodes 202 and 302, as well as B 204 and 304, and D 206 and 306 are depicted in FIGS. 2 and 3 at specific bit positions in the instructions, different lengths or bit positions are included within the scope of the invention.

Figure 4:
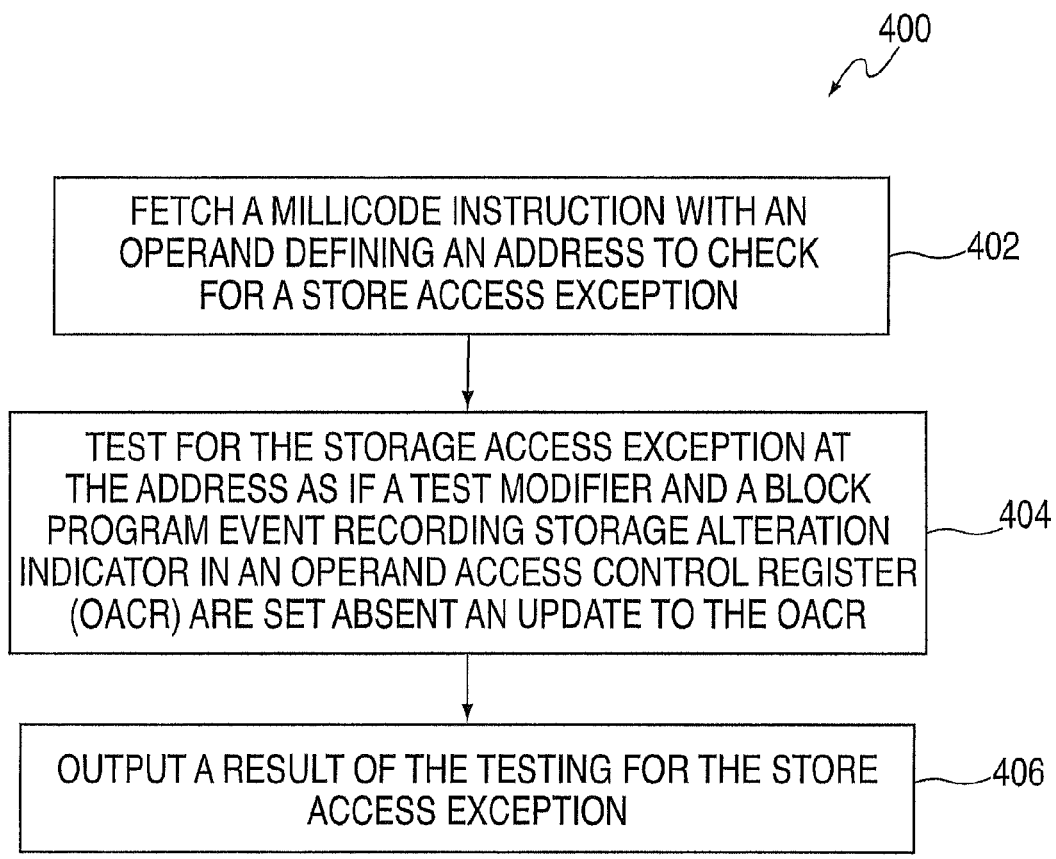
FIG. 4 depicts a process for implementing millicode store access checking instructions in accordance with an exemplary embodiment.

Turning now to FIG. 4, a process 400 for implementing millicode store access checking instructions will now be described in reference to FIGS. 1-3 and in accordance with an exemplary embodiment. At block 402, the instruction unit subsystem 16 fetches a millicode instruction with an operand defining an address to check for a store access exception. The operand may include a storage base address value and/or a storage displacement value addressing the system storage 11, such as B 204 and 304 and/or D 206 and 306. The system 10 executes the millicode instruction in milli-mode.

At block 404, the execution unit 24 tests for the store access exception at the address as if the test modifier in the OACR 28 is set absent an update to the OACR 28. This makes the millicode instruction appear as if a test instruction is being executed regardless of the actual state of the OACR 28. Furthermore, the testing for the store access exception at the address can also be performed as if the block PER storage alteration indicator in the OACR 28 is set absent an update to the OACR 28. Thus, delays due to AGI are prevented as an additional write to set the test modifier and/or block PER storage alteration indicator in the OACR 28 is avoided. In an exemplary embodiment, both the TACTM 200 and the STCTM 300 perform testing for the store access exception. The TACTM 200 also tests for a fetch access exception at the address as if the test modifier is set absent an update to the OACR 28. The TACTM 200 may perform testing for the fetch access exception as if the block PER storage alteration indicator is set absent an update to the OACR 28. Again, delays due to AGI between the millicode instruction and updating the OACR 28 are prevented as an additional write to set the test modifier and/or block PER storage alteration indicator in the OACR 28 is avoided.

At block 406, the execution unit 24 outputs a result of the testing for the store access exception. The execution unit 24 can update the processor state unit 40 and provide the result to the completion unit 30 for further operations. When the millicode instruction is the TACTM 200, the completion unit 30 updates the CC in the milli-PSW register 33 as previously described. Additionally, the completion unit 30 may update the CC in the milli-PSW register 33 for the TACTM 200 in response the testing for the fetch access exception. When the millicode instruction is the STCTM 300, the completion unit 30 passes information to the interrupt logic 45 that generates an interrupt in response to detecting the store access exception. Additionally, the execution unit 24 will perform no storage update.

It will be understood that the process 400 can be applied to any processing circuitry that incorporates a processor pipeline. For example, process 400 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry.

Technical effects and benefits include increasing instruction processing efficiency through avoiding updates to an OACR when checking for access exceptions. The TACTM and STCTM can execute as if test modifier and block PER storage alteration indicators in the OACR are set. This allows the TACTM instruction to check for store access exceptions as well as for fetch access exceptions without an AGI delay. An AGI delay is typically associated with an instruction that has advanced further in a processing pipeline that is dependant upon an instruction or operand that is further upstream in the processing pipeline. This also allows the STCTM instruction to check for store access exceptions and take an interrupt if an access exception is detected.

As described above, the embodiments of the invention may be embodied in the form of computer-implemented processes and apparatuses for practicing those processes. Embodiments of the invention may also be embodied in the form of computer program code containing instructions embodied in tangible media, such as read-only memory (ROM), electrically erasable programmable read-only memory (EEPROM), flash memory, or any other computer-readable storage medium, wherein, when the computer program code is loaded and executed in a computer, the computer becomes an apparatus for practicing the invention. The computer program code may be firmware, or code embedded within an integrated circuit (IC) chip, such as a processor. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for a millicode store access checking instruction, the system comprising:
   an operand access control register (OACR) including a test modifier indicator;
   an instruction unit subsystem for fetching and decoding instructions, wherein the instructions include a millicode instruction with an operand defining an address to check for a store access exception; and
   an execution unit to execute the millicode instruction, the execution unit performing a method comprising:
      receiving the millicode instruction from the instruction unit subsystem;
      testing for the store access exception at the address as if the test modifier is set without regard to the state of the OACR; and
      outputting a result of the testing for the store access exception.

2. The system of claim 1 wherein the millicode instruction further comprises a second operand to combine with the operand defining the address to check for the store access exception, and further wherein the operand is a storage base address value and the second operand is a storage displacement value.

3. The system of claim 1 wherein the OACR further comprises a block program event recording (PER) storage alteration indicator and the testing for the store access exception is performed as if the block PER storage alteration indicator is set absent an update to the OACR.

4. The system of claim 1 wherein the result of the testing for the store access exception is output to interrupt logic that generates an interrupt in response to detecting the store access exception.

5. The system of claim 1 wherein the result of the testing for the store access exception is output to a condition code.

6. The system of claim 1 wherein the execution unit further performs:
   testing for a fetch access exception at the address as if the test modifier is set absent an update to the OACR; and
   outputting a result of the testing for the fetch access exception to a condition code.

7. The system of claim 6 wherein the OACR further comprises a block program event recording (PER) storage alteration indicator and the testing for the fetch access exception is performed as if the block PER storage alteration indicator is set absent an update to the OACR.

8. A method for a millicode store access checking instruction in a processor, the method comprising:
   fetching a millicode instruction with an operand defining an address to check for a store access exception;
   testing for the store access exception at the address as if a test modifier in an operand access control register (OACR) is set without regard to the actual state of the OACR; and
   outputting a result of the testing for the store access exception.

9. The method of claim 8 wherein the millicode instruction further comprises a second operand to combine with the operand defining the address to check for the store access exception, and further wherein the operand is a storage base address value and the second operand is a storage displacement value.

10. The method of claim 8 wherein the OACR further comprises a block program event recording (PER) storage alteration indicator and the testing for the store access exception is performed as if the block PER storage alteration indicator is set absent an update to the OACR.

11. The method of claim 8 wherein the result of the testing for the store access exception is output to interrupt logic that generates an interrupt in response to detecting the store access exception.

12. The method of claim 8 wherein the result of the testing for the store access exception is output to a condition code.

13. The method of claim 8 further comprising:
   testing for a fetch access exception at the address as if the test modifier is set absent an update to the OACR; and
   outputting a result of the testing for the fetch access exception to a condition code.

14. The method of claim 13 wherein the OACR further comprises a block program event recording (PER) storage alteration indicator and the testing for the fetch access exception is performed as if the block PER storage alteration indicator is set absent an update to the OACR.

15. A computer program product for executing a millicode store access checking instruction, the computer program product comprising:
  a computer-readable storage medium storing instructions for executing the millicode store access checking instruction, the millicode store access checking instruction comprising a method of:
  accessing an operand defining an address to check for a store access exception;
  testing for the store access exception at the address as if a test modifier in an operand access control register (OACR) is set without regard to the actual state of the OACR; and
  outputting a result of the testing for the store access exception.

16. The computer program product of claim 15 wherein the millicode instruction further comprises a second operand to combine with the operand defining the address to check for the store access exception, and further wherein the operand is a storage base address value and the second operand is a storage displacement value.

17. The computer program product of claim 15 wherein the OACR further comprises a block program event recording (PER) storage alteration indicator and the testing for the store access exception is performed as if the block PER storage alteration indicator is set absent an update to the OACR.

18. The computer program product of claim 15 wherein the result of the testing for the store access exception is output to interrupt logic that generates an interrupt in response to detecting the store access exception.

19. The computer program product of claim 15 wherein the result of the testing for the store access exception is output to a condition code.

20. The computer program product of claim 15 further comprising:
  testing for a fetch access exception at the address as if the test modifier is set absent an update to the OACR; and
  outputting a result of the testing for the fetch access exception to a condition code.

* * * * *